United States Patent [19]

Gruner et al.

[11] Patent Number: 4,575,797

[45] Date of Patent: Mar. 11, 1986

[54] DIGITAL DATA PROCESSING SYSTEM INCORPORATING OBJECT-BASED ADDRESSING AND CAPABLE OF EXECUTING INSTRUCTIONS BELONGING TO SEVERAL INSTRUCTION SETS

[75] Inventors: Ronald H. Gruner, Cary, N.C.; Gerald F. Clancy, Saratoga, Calif.; Craig J. Mundie, Cary, N.C.; Steven J. Wallach, Saratoga, Calif.; Stephen I. Schleimer, Chapel Hill, N.C.; Richard G. Bratt, Wayland, Mass.

[73] Assignee: Data General Corporation, Westboro, Mass.

[21] Appl. No.: 266,426

[22] Filed: May 22, 1981

[51] Int. Cl.$^4$ ............................................. G06F 9/30
[52] U.S. Cl. ..................................................... 364/200
[58] Field of Search ........................ 364/900, 200, 300

[56] References Cited

U.S. PATENT DOCUMENTS

| | | | |
|---|---|---|---|
| 3,983,539 | 9/1976 | Faber et al. | 364/200 |
| 4,025,901 | 5/1977 | Bachman et al. | 364/200 |
| 4,130,867 | 12/1978 | Bachman et al. | 364/200 |
| 4,138,719 | 2/1979 | Swanstrom et al. | 364/200 |
| 4,215,406 | 7/1980 | Gomola et al. | 364/200 |
| 4,216,528 | 8/1980 | Robertson | 364/200 |
| 4,236,204 | 11/1980 | Groves | 364/200 |
| 4,307,447 | 12/1981 | Trovanzano et al. | 364/200 |
| 4,388,682 | 6/1983 | Eldridge | 364/200 |

OTHER PUBLICATIONS

IBM System 360/Principles of Operations.

*Primary Examiner*—Gareth D. Shaw
*Assistant Examiner*—Jameson Lee
*Attorney, Agent, or Firm*—Robert F. O'Connell; Gerald J. Cechony

[57] ABSTRACT

A digital computer system having a memory system organized into objects for storing data and a processor for processing data in response to instructions. An object identifier is associated with each object. The memory system responds to logical addresses for data which specify the object containing the data and the offset of the data in the object. The objects include procedure objects and data objects. The procedure objects contain procedures including the instructions. Each instruction contains an operation code which belongs to one of several sets of operation codes. All instructions in a single procedure belong to a single operation code set, and associated with each procedure is an operation code set identifier specifying the operation code set to which the instructions in the procedure belongs. Operation codes are decoded in the processor in response to both the operation code and a dialect value representing the operation code set identifier for the operation code set to which the operation code belongs. The dialect value changes only on execution of a call operation or a return operation.

26 Claims, 4 Drawing Figures

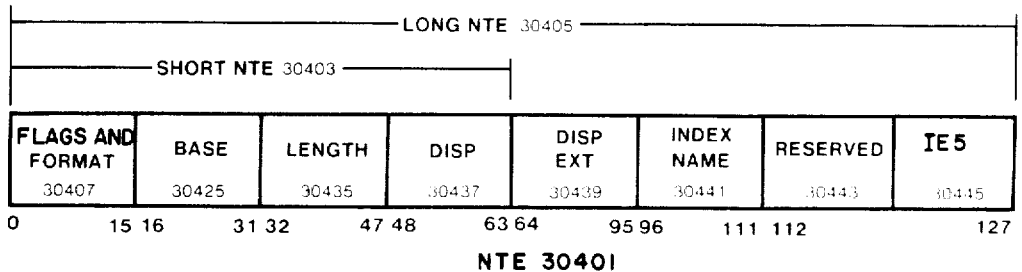
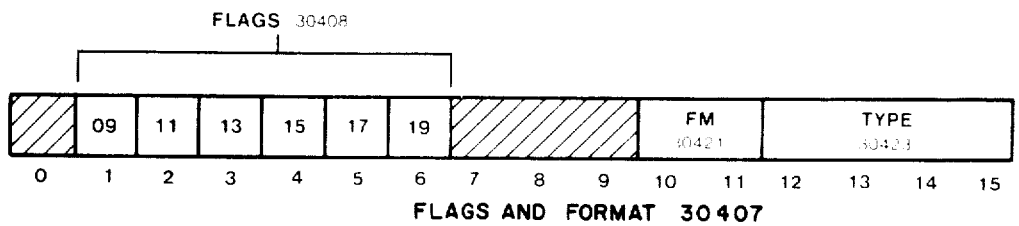
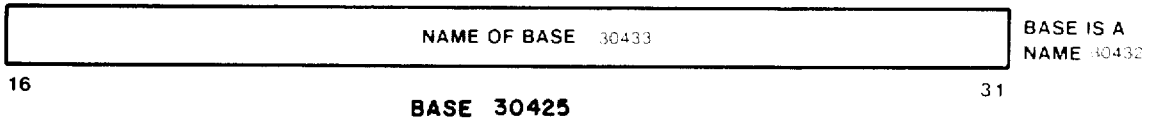
FIG. 304

DIGITAL DATA PROCESSING SYSTEM INCORPORATING OBJECT-BASED ADDRESSING AND CAPABLE OF EXECUTING INSTRUCTIONS BELONGING TO SEVERAL INSTRUCTION SETS

CROSS REFERENCE TO RELATED APPLICATIONS

The present patent application is related to other patent applications assigned to the assignee of the present application.

BACKGROUND OF THE INVENTION

1. Field of the Invention

The present invention relates to a digital data processing system and, more particularly, to a multiprocess digital data processing system suitable for use in a data processing network and having a simplified, flexible user interface and flexible, multileveled internal mechanisms.

2. Description of Prior Art

A general trend in the development of data processing systems has been towards systems suitable for use in interconnected data processing networks. Another trend has been towards data processing systems wherein the internal structure of the system is flexible, protected from users, and effectively invisible to the user and wherein the user is presented with a flexible and simplified interface to the system.

Certain problems and shortcomings affecting the realization of such a data processing system have appeared repeatedly in the prior art and must be overcome to create a data processing system having the above attributes. These prior art problems and limitations include the following topics.

First, the data processing systems of the prior art have not provided a system wide addressing system suitable for use in common by a large number of data processing systems interconnected into a network. Addressing systems of the prior art have not provided sufficiently large address spaces and have not allowed information to be permanently and uniquely identified. Prior addressing systems have not made provisions for information to be located and identified as to type or format, and have not provided sufficient granularity. In addition, prior addressing systems have reflected the physical structure of particular data processing systems. That is, the addressing systems have been dependent upon whether a particular computer was, for example, an 8, 16, 32, 64 or 128 bit machine. Since prior data processing systems have incorporated addressing mechanisms wherein the actual physical structure of the processing system is apparent to the user, the operations a user could perform have been limited by the addressing mechanisms. In addition, prior processor systems have operated as fixed word length machines, further limiting user operations.

Prior data processing systems have not provided effective protection mechanisms preventing one user from effecting another user's data and programs without permission. Such protection mechanisms have not allowed unique, positive identification of users requesting access to information, or of information, nor have such mechanisms been sufficiently flexible in operation. In addition, access rights have pertained to the users rather than to the information, so that control of access rights has been difficult. Finally, prior art protection mechanisms have allowed the use of "Trojan Horse arguments". That is, users not having access rights to certain information have been able to gain access to that information through another user or procedure having such access rights.

Yet another problem of the prior art is that of providing a simple and flexible interface user interface to a data processing system. The character of user's interface to a data processing system is determined, in part, by the means by which a user refers to and identifies operands and procedures of the user's programs and by the instruction structure of the system. Operands and procedures are customarily referred to and identified by some form of logical address having points of reference, and validity, only within a user's program. These addresses must be translated into logical and physical addresses within a data processing system each time a program is executed, and must then be frequently retranslated or generated during execution of a program. In addition, a user must provide specific instructions as to data format and handling. As such reference to operands or procedures typically comprise a major portion of the instruction stream of the user's program and requires numerous machine translations and operations to implement. A user's interface to a conventional system is thereby complicated, and the speed of execution of programs reduced, because of the complexity of the program references to operands and procedures.

A data processing system's instruction structure includes both the instructions for controlling system operations and the means by which these instructions are executed. Conventional data processing systems are designed to efficiently execute instructions in one or two user languages, for example, FORTRAN or COBOL. Programs written in any other language are not efficiently executable. In addition, a user is often faced with difficult programming problems when using any high level language other than the particular one or two languages that a particular conventional system is designed to utilize.

Yet another problem in conventional data processing systems is that of protecting the system's internal mechanisms, for example, stack mechanisms and internal control mechanisms, from accidental or malicious interference by a user.

Finally, the internal structure and operation of prior art data processing systems have not been flexible, or adaptive, in structure and operation. That is, the internal structure structure and operation of prior systems have not allowed the systems to be easily modified or adapted to meet particular data processing requirements. Such modifications may include changes in internal memory capacity, such as the addition or deletion of special purpose subsystems, for example, floating point or array processors. In addition, such modificaions have significantly effected the users interface with the system. Ideally, the actual physical structure and operation of the data processing system should not be apparent at the user interface.

The present invention provides data processing system improvements and features which solve the above-described problems and limitations.

SUMMARY OF THE INVENTION

The present invention relates generally to digital computer systems and more specifically to digital computer systems employing object-based addressing of data and instructions whose operation codes may come from several sets of operation codes.

The memory system is organized into objects containing data items. Each object is identified by an object identifier. Locations of data items in the memory system are specified by means of the object identifier for the object containing the data item and an offset specifying the location at which the data item begins in the object. The memory system responds to a memory operation specifier consisting of a memory command specifying a memory operation such as read data or write data, a logical address containing a representation of an object identifier and an offset.

The data items include instructions which are executable by the processor. The instructions include operation codes specifying operations to be performed by the processor and operands representing data items on which the operations are to be performed. The processor responds to several different sets of operation codes. Each such set of operation codes is termed an S-language. Each instruction belongs to a sequence of instructions called a procedure. Operation codes for all instructions in a given procedure belong to a single S-language.

The processor includes operation code decoding apparatus, logical address generating apparatus for generating logical addresses specifying objects and locations in objects in response to the operands, and control apparatus for controlling the processor in response to signals from the other components and the memory system and providing memory commands to the memory system. The logical address generation hardware also generates the logical address of the next instruction to be executed. A dialect value in the processor specifies the S-language to which the instructions the processor is currently responding belong. In decoding an operation code, the processor employs both the operation code and the dialect value.

It is thus an object of the present invention to provide an improved data processing system.

It is another object of the present invention to provide a data processing system capable of use in large, interconnected data processing networks.

It is yet another object of the present invention to provide an improved addressing mechanism suitable for use in large, interconnected data processing networks.

It is a further object of the present invention to provide an improved information protection mechanism.

It is still another object of the present invention to provide a simplified and flexible user interface to a data processing system.

It is yet a further object of the present invention to provide an improved mechanism for referring to operands.

It is a still further object of the present invention to provide an instruction structure allowing efficient data processing system operation with a plurality of high level user languages.

It is a further object of the present invention to provide data processing internal mechanisms protected from user interference.

It is yet another object of the present invention to provide a data processing system having a flexible internal structure capable of multiple, concurrent operations.

Other objects, advantages and features of the present invention will be understood by those of ordinary skill in the art, after referring to the following detailed description of the preferred embodiments and drawings wherein:

BRIEF DESCRIPTION OF DRAWINGS

FIG. 304 is a diagram illustrating name table entries;

DESCRIPTION OF THE PREFERRED EMBODIMENTS

Figure 2:
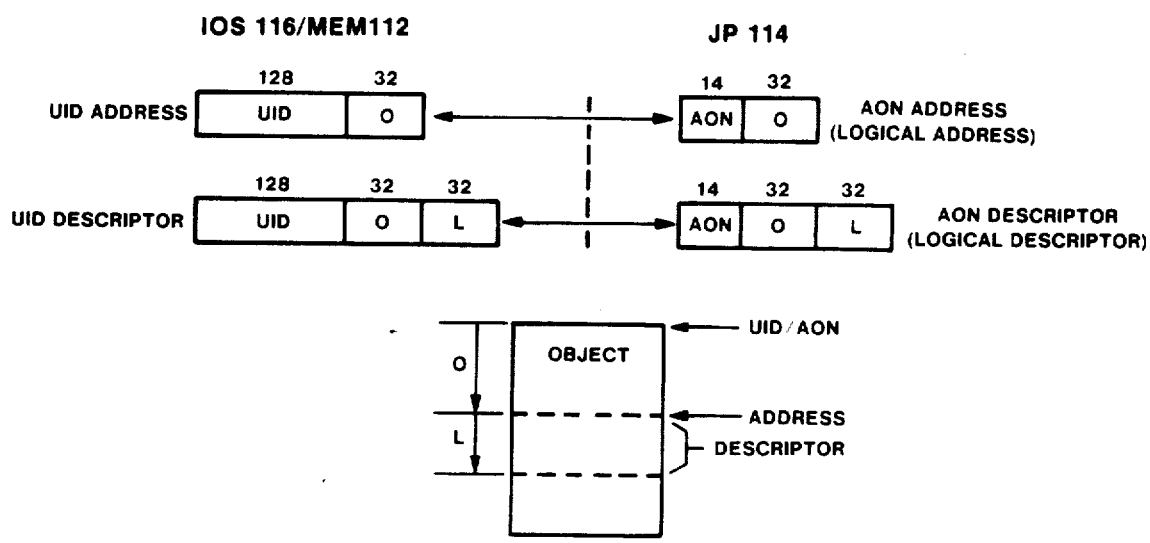
FIG. 2 is a diagram illustrating computer system addressing structure of the present invention.
Figure 3:
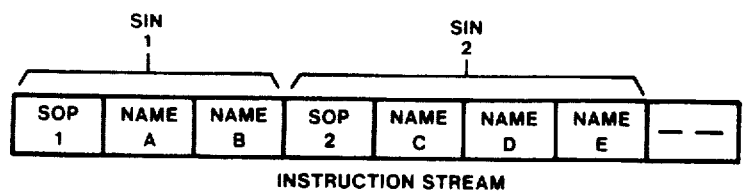
FIG. 3 is a diagram illustrating the computer system instruction stream of the present invention.
Figure 404:
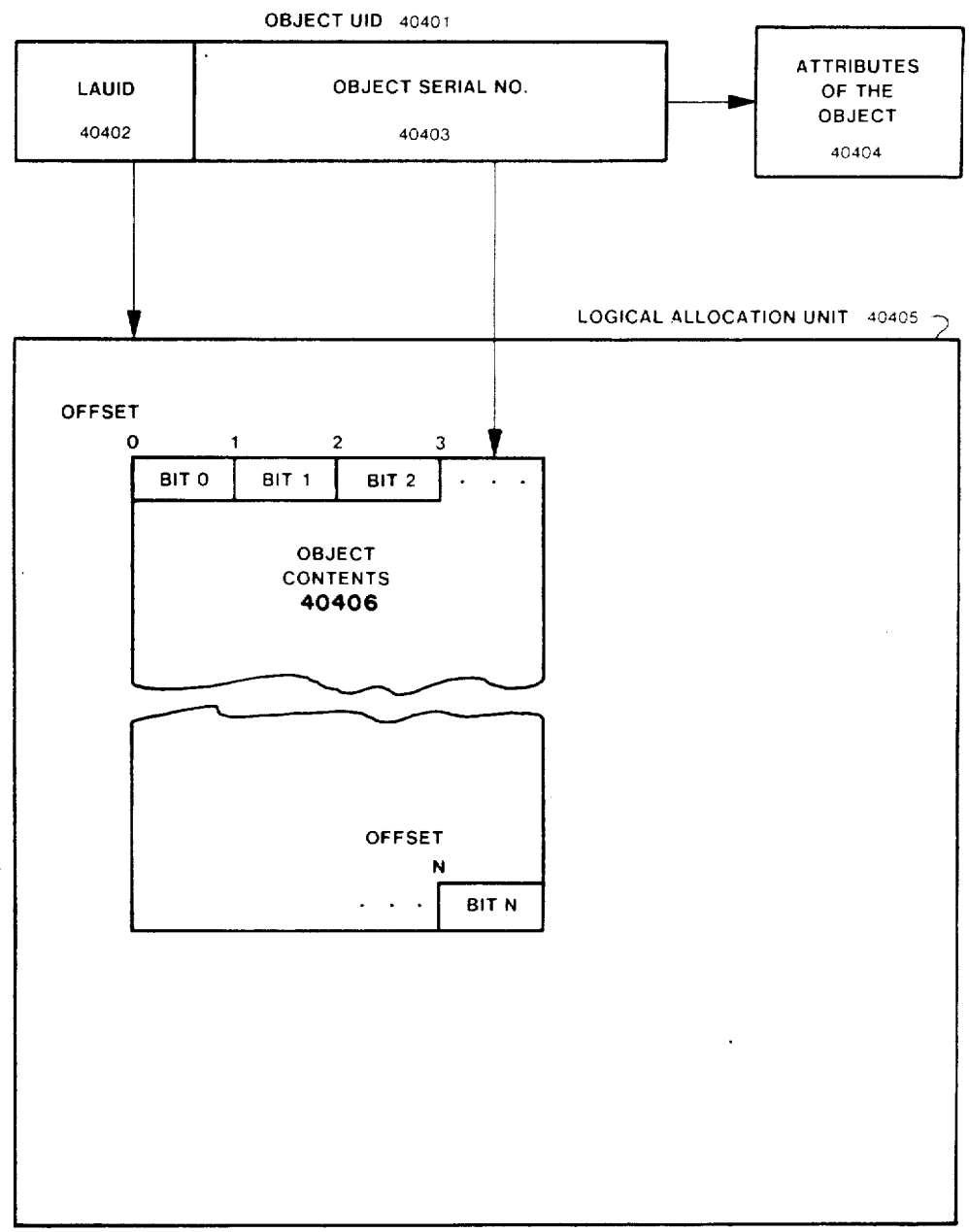
FIG. 404 is a diagram illustrating an EOS view of objects.

The preferred embodiments of the present invention are disclosed in U.S. Pat. App. Ser. No. 266,402, Ward Baxter II, et al., filed May 22, 1981 and entitled Digital Data Processing System having an I/O Means using Unique Address-Providing and Access Priority Control Techniques. That entire application, which is owned by the same assignee as the present application, is hereby incorporated by reference into the present application. Particular attention is directed to Chapter 3(B)(c) and 3(B)(d) and to Chapter 4(B),(C), and (D) of that application and to the Figures referred to therein.

What is claimed is:

1. A digital computer system comprising:
    (1) memory means for storing and providing items of data, said items of data including instructions, each one of said instructions containing an operation code of a plurality of operation codes, said operation codes belonging to a plurality of functionally different operation code sets, said operation codes in a given one of said operation code sets being definable solely with reference to said given operation code set, and said instructions having common formats; and
    (2) processor means connected to said memory means for receiving said items including said instructions and responding to each said received instruction by performing said operation defined for said operation code in said received instruction in said operation code set to which said operation code in said received instruction belongs.

2. In the digital computer system of claim 1, and wherein:
    said instructions are subdivided into syllables having fixed sizes; and
    said processor means includes
        parsing means for receiving said received instructions and providing said syllables and
        means connected to said parsing means for receiving said syllables from said parsing means and responding thereto by performing said operation defined for said operation code in said received instruction.

3. A digital computer system comprising:
    (1) memory means for performing memory operations including storing and providing items of data, said items of data including instructions containing operation codes defining operations, said instructions having said operation codes belonging to a plurality of functionally different operation code sets, said operation codes in a given one of said operation code sets being definable solely with reference to said given operation code set and any said instruction belonging to any of said plurality of operation code sets being contained in a sequence of said instructions, but said sequence containing only said instructions containing said operation codes belonging to one and the same operation code set of said plurality of operation code sets; and (2) processor means connected to said memory means for performing said operations specified by said operation codes in response to said instructions, said processor means including (A) operation code decoding means in said processor means for receiving said operation codes in said sequence currently being executed by said processor means and decoding each said operation code as required by said operation code set to which said operation codes in said sequence currently being executed belong; and (B) control means responsive to said operation code decoding means for controlling operation of said processor means.

4. In the digital computer system of claim 3, and wherein:

certain said instructions further include operand syllables representing said items of data processed by said processor means in response to said operation code in said instruction;

said operand syllables in each said sequence have a single size; and said processor means further includes operand syllable interpretation means for interpreting said operand syllables.

5. In the digital computer system of claim 3, and wherein:

all said operation codes in all said instructions have the same size.

6. In the digital computer system of claim 3, and wherein:

said memory means further includes an operation code set identifier of said items associated with each one of said sequences for specifying which said one operation code set all said operation codes in said instructions in said one sequence belong to; and said operation code decoding means responds to said operation code and to said operation code set identifier associated with said sequence currently being executed by said processor means by decoding said operation code as required by said operation code set specified by said operation code set identifier.

7. In the digital computer system of claim 6, and wherein:

said control means includes control store means for storing a plurality of microinstruction sequences, said plurality of microinstruction sequences including a corresponding set of said microinstruction sequences corresponding to each one of said operation code sets, each one of said corresponding sets of microinstruction sequences including a corresponding said microinstruction sequence corresponding to each said operation code in said operation code set corresponding to said one corresponding set of microinstruction sequences, means responsive to said operation code and to said operation code set identifier for selecting said corresponding microinstruction sequence corresponding to said operation code in said corresponding set of microinstruction sequences corresponding to said operation code set specified by said operation code set identifier, and microinstruction sequence execution means for executing said microinstructions in said selected corresponding microinstruction sequence and controlling said processor means in response to said executed microinstructions.

8. In the digital computer system of claim 6, and wherein:

each one of said operation code sets includes a call operation code specifying a call operation to which said processor means responds by suspending said execution of said sequence containing said instruction with said call operation code and commencing another said execution of a specified said sequence specified in said instruction containing said call operation code and a return operation code specifying a return operation to which said processor means responds by terminating said another execution and resuming sad suspended execution;

said processor means provides said operation code set identifier associated with said specified sequence to said operation code interpretation means in response to said call operation code; and said processor means provides said operation code set identifier associated with said sequence being executed in said suspended execution to said operation code decoding means in response to said return operation code.

9. In the digital computer system of claim 8, and wherein:

said operation code decoding means includes means for storing a dialect value representing said operation code set identifier for said sequence currently being executed;

said items of data further include an operation code set identifier translation table associating each said operation code set identifier with said dialect value indicating said operation code set identified by said operation code set identifier; and said processor means further responds to said call operation by storing said operation code set identifier indicating said operation code set to which said sequence of instructions belongs whose said execution is being suspended in said memory means, locating said operation code set identifier associated with said specified sequence, and using said operation code set identifier translation table to obtain said dialect value associated with said operation code set identifier associated with said specified sequence; and said processor means further responds to said return operation by obtaining said stored operation code set identifier from said memory means and using said operation code set identifier translation table to obtain said dialect value associated with said sequence whose said execution is being resumed.

10. In the digital computer system of claim 7, and wherein:

said items of data in said memory means include said corresponding sets of microinstruction sequences corresponding to said operation code sets; and said processor means includes means for loading first certain said microinstructions from said corresponding sets of microinstruction sequences into said control store.

11. In the digital computer system of claim 10, and wherein:

second certain of said microinstructions in said corresponding sets of microinstruction sequences are not loaded into said control store; and said microinstruction sequence execution means includes means for detecting that a next said microinstruction to be executed is one of said second certain microinstructions and fetching said next microinstruction from said memory means.

12. A digital computer system comprising:
(1) memory means for performing memory operations including storing and providing items of data, said memory means including
   (A) memory organization means for organizing said memory means into objects allowing location of said items of data in said memory means, each one of said objects being identified by means of an object identifier and
   (B) memory operation means responsive to a memory operation specifier including
      (i) a logical address specifying one said object identifier and a location of one of said items of in said object identified by said specified object identifier and
      (ii) a memory command specifying one of said memory operations for performing said memory operation specified by said memory command on said item of data specified by said logical address
   and wherein said items of data include instructions, each one of said instructions containing an operation code of a plurality of operation codes, said operation codes belonging to a plurality of functionally different operation code sets, said operation codes in a given one of said operation code sets being definable solely with reference to said given operation code set, and
(2) processor means connected to said memory means for processing said items of data and providing said memory operation specifier to said memory means in response to said instructions, said processor means including
   (A) operation code decoding means for decoding said operation code in a current instruction of said instructions currently being responded to by said processor means, said operation decoding means including means for storing a dialect value indicating which said operation code set said operation code in said current instruction belongs to and operating to decode said operation code in response to said operation code and said dialect value,
   (B) logical address generation means for providing said logical addresses and including next instruction address generation means for providing said logical address of a next said current instruction, and
   (c) control means responsive to said operation code decoding means and said logical address generation means for controlling operation of said processor means and providing said memory operation specifier including said logical address provided by said logical address generation means to said memory means.

13. In the digital computer system of claim 12, and wherein:
any said instruction belonging to any of said plurality of operation code sets is contained in a sequence of said instructions and is responded to by said processor means when said processor means performs an execution of said sequence containing said instruction; and all said instructions in any one said sequence belong to a single said operation code set.

14. In the digital computer system of claim 13, and wherein:
each said operation code set includes a call operation code specifying a call operation to which said processor means responds by suspending said execution of said sequence currently being performed by said processor means, locating a specified said sequence specified in said instruction containing said call operation code, setting said dialect value to indicate said operation code set to which said instructions in said specified sequence belong, and commencing another said execution executing said instructions in said specified sequence;

each one of said operation code sets includes a return operation code specifying a return operation for terminating said another execution of said specified sequence, setting said dialect value to indicate said operation code set to which said instructions in said sequence belong whose said execution was suspended to commence said another execution, and resuming said suspended execution; and said processor means sets said dialect value only in response to said call operation code and said return operation code of said operation codes.

15. In the digital computer system of claim 14, and wherein:
each said operation code set is associated with an operation code set identifier of said items of data identifying said operation code set;

said items of data further include an operation code set identifier translation table associating each said operation code set identifier with said dialect value indicating said operation code set identified by said operation code set identifier; and said processor means further responds to said call operation by storing said operation code set identifier indicating said operation code set to which said sequence of instructions belongs whose said execution is being suspended in said memory means, locating said operation code set identifier associated with said specified sequence, and using said operation code set identifier translation table to obtain said dialect value associated with said operation code set identifier associated with said specified sequence; and said processor means further responds to said return operation by obtaining said stored operation code set identifier from said memory means and using said operation code set identifier translation table to obtain said dialect value associated with said sequence whose said execution is being resumed.

16. In the digital computer system of claim 12, and wherein: all of said operation codes have the same size.

17. In the digital computer system of claim 12, and wherein:
certain said instructions further contain operand syllables representing operands used in said operations specified by said operation codes;

said operand syllables in each said sequence have a single size; and said processor means further includes operand syllable interpretation means operating under control of said control means and responsive to said operands for interpreting said operand syllables.

18. In the digital computer system of claim 17, and wherein: all said operation codes have the same size.

19. In the digital computer system of claim 12, and wherein:
  access to said items of data located by means of each said object is limited in each one of said objects to a set of subjects identifying entities for which said digital computer system may access said items of data and is further limited for each subject of said set of subjects to a set of said memory operations;
  said memory means is further responsive to a representation of a current subject of said subjects for which said digital computer system is currently accessing said item of data specified by said logical address and performs said memory operation specified by said memory command on said item of data specified by said logical address when said current subject is one of said set of subjects having access to said object specified by said logical address and said memory command specifies one of said set of memory operations which said current subject may perform on said items of data belonging to said object specified by said logical address; and
  said control means further provides said representation of said current subject to said memory means.

20. In the digital computer system of claim 19, and wherein:
  each said instruction is contained in a sequence of said instructions and is executed by said processor means when said processor means performs an execution of said sequence containing said instruction; and
  said sequences are stored in procedure objects of said objects;
  each one of said procedure objects has associated with it a domain of execution attribute; and
  said current subject includes said domain of execution attribute for said procedure object containing said sequence currently being executed by said processor means.

21. In the digital computer system of claim 20, and wherein:
  said current subject further includes a principal specifier specifying a user of said digital computer system.

22. In the digital computer system of claim 20, and wherein:
  each one of said operation code sets includes a call operation code specifying a call operation to which said processor means responds by suspending said execution of said sequence currently being performed by said processor means, locating a specified said sequence specified in said instruction containing said call operation code, setting said representation of said current subject for said another execution to represent another said current subject including said domain of execution attribute associated with said procedure object to which said specified sequence belongs, and commencing another said execution executing said instructions in said specified sequence; and
  each one of said operation code sets includes a return operation code to which said processor means responds by terminating said another execution of said specified sequence, setting said representation of said current subject to represent said current subject for which said processor means was performing said suspended execution, and resuming said suspended execution.

23. In the digital computer system of claim 19, and wherein:
  said memory organization means further specifies a current size for each said object;
  said memory operation specifier further includes a length specifier specifying a length beginning at said location specified by said logical address; and
  said memory operation means further does not perform said memory operation specified by said memory command when said item of data specified by said logical address and said length specifier extends beyond said current size of said object specified in said logical address.

24. In the digital computer system of claim 12, and wherein:
  said memory means further includes
    (A) global memory means for storing said items of data belonging to said objects and
    (B) local memory means connected between said processor means and said global memory means and responsive to said memory operation specifier for receiving copies of said items of data from said global memory means and providing altered copies of said items of data to said global memory means and for performing said memory operation specified in said memory operation specifier on said copy of said item of data specified by said logical address means;
  said memory organization means includes a logical allocation unit directory item in said global memory means including a plurality of logical allocation unit directory entry items for defining said objects, each one of said logical allocation unit directory entry items including
    (i) an object identifier item whose value is said object identifier specifying said object defined by said logical allocation unit directory entry item and
    (ii) a data location item specifying a location of said items of data belonging to said defined object in said global memory;
  said objects include
    (A) procedure objects to which said sequences belong and
    (B) data objects to which said items of data other than said items of data contained in said procedure objects belong; and
  said memory operation means includes
    (A) a local memory control table in said local memory means accessible by means of said logical addresses for indicating whether said copy of said item of data specified by said logical address is present in said local memory and the location of said item in said local memory and
    (B) virtual memory management means responsive to said logical addresses for translating said logical address specifying said item of data into the location of said copy of said item of data in said local memory means when said local memory control table indicates that said copy is present in said local memory means and otherwise determining the location of said item of data in said global memory means by means of said logical address and said logical allocation unit directory and fetching said copy from said global memory means.

25. In the digital computer system of claim 24, and wherein:
- said logical allocation unit directory entry item further includes
  - an access control list item specifying a set of subjects which may access said defined object and a set of said memory operations for each said subject in said set of subjects, each one of said subject identifying an entity for which said digital computer system may access said items of data;
- said memory operation means further includes
  - an access control table in said local memory means accessible by means of said object identifiers containing copies of said access control list items for all said objects from which said items of data have been copied into said local memory means and
  - access checking means for providing said copies of said access control list items in said local memory means and for responding to said representation of said current subject received from said processor means and to said representation of said object identifier and said memory command specified in said memory operation specifier by inhibiting said local memory means from performing said memory operation specified by said memory operation specifier unless said copy of said access control list item for said object specified by said representation of said object identifier indicates that said current subject is one of said specified subjects and said memory operation specified by said memory command on said item of data is one of said specified memory operations.

26. In the digital computer system of claim 25, and wherein:
- each one of said logical allocation unit directory entry items further contains a size attribute specifying the current size of said defined object;
- said access control table further contains a copy of said size attribute for each said object having copies of said items of data in said local memory means;
- said logical address generation means provides a logical descriptor containing said logical address and a length specifier;
- said memory operation specifier further includes said logical descriptor and said local memory means responds to said logical descriptor by providing said item of data at said location specified by said representation of said object identifier and said offset and having the length specified by said length specifier; and
- said access checking means further provides said copy of said size attribute in said access control table and inhibits said local memory means from performing said memory operation specified by said memory operation specifier when said item of data specified by said logical address and said length specifier extends beyond said current size of said object specified by said logical address.

* * * * *